Patented Feb. 9, 1937

2,070,109

UNITED STATES PATENT OFFICE 2,070,109

EASILY SOLUBLE SALTS OF ACYLAMINO-PHENOL-ARSONIC ACIDS

Louis Benda, Frankfort-on-the-Main, and Otto Sievers, Hohe Tanne, near Hanau-on-the-Main, Germany, assignors to Winthrop Chemical Company, Inc., New York, N. Y., a corporation of New York No Drawing. Application September 18, 1931, Serial No. 563,664. In Germany October 1, 1930

5 Claims. (Cl. 260—14)

This invention relates to easily soluble salts especially double alkali salts of acylamino-phenol-arsonic acids.

U. S. application Ser. No. 394,748 filed September 23, 1929, describes the manufacture of easily soluble di-sodium salts of acylamino-phenol-arsonic acids and their derivatives and of solutions containing the same by dissolving in double the equivalent amount of an aqueous caustic soda or sodium carbonate solution a 4-hydroxy-3-acylamino-aryl-arsonic acid.

We have now found that not only disodium salts as disclosed in the application above referred to but dialkali metal salts in general are distinguished by a high solubility and at the same time by the absence of any irritation when injected.

Like the disodium salts they are found to show no toxicity which is a surprising fact since the lithium and potassium salts of 3-acylamino-4-phenol-1-arsonic acids hitherto described (see U. S. specification No. 1,532,361) are unsuitable for therapeutical purposes because of their toxicity.

The new dialkali-metal salts correspond to the probable general formula:

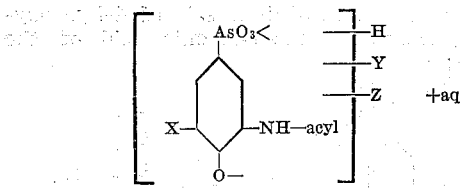

(wherein X stands for hydrogen or chlorine, Y for sodium or potassium and Z for potassium or lithium).

According to one feature of this invention, the process of manufacture is carried out in the same manner as described in the application above referred to, by dissolving the acids concerned in aqueous solutions of double the equivalent quantities of alkalies of which only one equivalent may be caustic soda or sodium carbonate.

According to a further feature of this invention the dialkali metal salts of these acids may be obtained by another process starting from a mono-alkali metal salt instead of the free arsonic acid and treating this salt with one molecular proportion of an alkali metal hydroxide. By using in this case a hydroxide of an alkali metal different from that present in the mono-alkali metal salt of the arsonic acid, dialkali metal salts are obtained containing two different atoms of alkali metals; by treating a mono-sodium salt with sodium hydroxide, products are obtained which are identical with those of U. S. application Ser. No. 394,748.

As alkali metal compounds, there may be mentioned the compounds of lithium, potassium or sodium. In order to isolate the di-alkali metal salt the solution obtained may be precipitated by an agent which is soluble in water but does not dissolve the di-alkali metal salt, such as alcohol, acetone or common salt solution.

In order to further illustrate our invention, the following examples are given. We wish it, however, to be understood that we are not limited to the particular products nor reaction conditions mentioned therein.

*Example 1.—(Sodium lithium salt)*

165 grams of pure 3-acetylamino-4-hydroxy-benzene-1-arsonic acid are introduced into 600 cc. of hot water and dissolved by the addition of 60 cc. of 10 N-caustic soda solution and 120 cc. of a 5 N-solution of lithium hydroxide. The solution is heated for some time with animal charcoal, filtered and made up to 1000 cc. The sterilized solution may be used as such for injecting purposes or it may be diluted. It exhibits the remarkable property of maintaining dissolved considerable amounts of mono-sodium salt. These mixtures are also suitable for therapeutical purposes.

By treating the same arsonic acid with 240 cc. of a 5 N-solution of lithium hydroxide without the use of caustic soda, the corresponding di-lithium salt is obtained which is more easily soluble but shows otherwise similar properties.

*Example 2.—(Sodium potassium salt)*

1552 grams of pure 3-acetylamino-5-chloro-4-hydroxy-benzene-1-arsonic acid are dissolved in 1000 cc. of water while adding 500 cc. of a 10 N-caustic soda solution and 500 cc. of a 10 N-caustic potash solution. The clear solution is allowed to run, while well stirring, into 5000 cc. of cooled pure alcohol, whereupon the sodium-potassium salt separates in a crystalline form. It is filtered by suction and washed with alcohol and ether.

*Example 3.—(Potassium lithium salt)*

1375 grams of pure 3-acetylamino-4-hydroxy-benzene-1-arsonic acid are dissolved in 1000 cc. of a 5 N-solution of lithium hydroxide and 500 cc. of a 10 N-caustic potash solution and 1000 cc. of water. The clear solution is allowed to run slowly into 10 liters of cooled pure alcohol whereupon the potassium lithium salt separates in the form of fine crystals. It is filtered by suction and washed with alcohol and ether.

*Example 4.—(Sodium potassium salt)*

185 grams of the mono sodium salt of 3-acetylamino-4-hydroxy-benzene-1-arsonic acid (containing four molecules of water of crystallization) are mixed with 100 cc. of water, and 50 cc. of a 10 N-caustic potash solution are added, while shaking. The clear solution is filtered into 1500 cc. of pure alcohol and the sodium potassium salt precipitated is filtered by suction and washed with alcohol and ether. It forms a white crystalline powder which is readily soluble in water.

By starting from the mono potassium salt and treating it with potash solution, the corresponding di-potassium salt is obtained, which shows similar properties.

*Example 5.—(Di-sodium salt)*

169 grams of 3-benzoylamino-4-hydroxy-benzene-1-arsonic acid are introduced into 1000 cc. of hot water and dissolved by the addition of 50 cc. of a 10 N-caustic soda solution. After cooling the mono sodium salt is isolated by filtration. It is dissolved in 200 cc. of water and 50 cc. of a 10 N-caustic soda solution and filtered into 1500 cc. of pure alcohol. After filtering, washing and drying the product forms a white crystalline powder, easily soluble in water.

*Example 6.—(Potassium lithium salt)*

232 grams of the mono potassium salt of 3-acetylamino-4-hydroxy-benzene-1-arsonic acid (containing four molecules of water of crystallization) are introduced into 6000 cc. of hot water and dissolved by the addition of 1200 cc. of a 5 N-solution of lithium hydroxide. The solution is heated with animal charcoal, filtered and made up to 10 liters. The sterilized solution is immediately suitable for injecting purposes.

We claim:

1. The di-alkali metal salts of hydroxyacyl-amino-aryl-arsonic acids of the general formula:

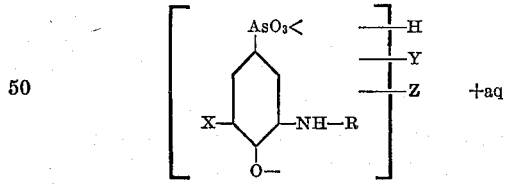

wherein X stands for a member of the group consisting of hydrogen and chlorine, Y for a member of the group consisting of sodium and potassium, Z for a member of the group consisting of potassium and lithium, and R for a member of the group consisting of acetyl and benzoyl, which products are crystalline compounds soluble in threefold their weight of water, very difficultly soluble in strong alcohol and acetone and insoluble in ether.

2. The di-alkali-metal salts of hydroxy-acyl-amino-aryl-arsonic acids of the general formula:

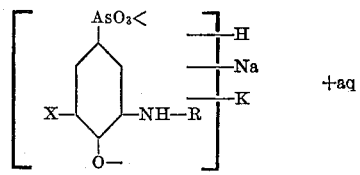

wherein X stands for a member of the group consisting of hydrogen and chlorine and R for a member of the group consisting of acetyl and benzoyl, which products are crystalline compounds soluble in threefold their weight of water, very difficultly soluble in strong alcohol and acetone and insoluble in ether.

3. The sodium-potassium salt of 4-hydroxy-3-acetylamino-benzene-1-arsonic acid of the formula:

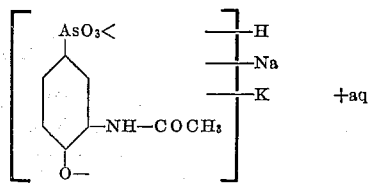

which product is a crystalline compound soluble in threefold its weight of water, very difficultly soluble in strong alcohol and acetone and insoluble in ether.

4. The sodium-lithium salt of 4-hydroxy-5-chloro-3-acetylamino-benzene-1-arsonic acid of the formula:

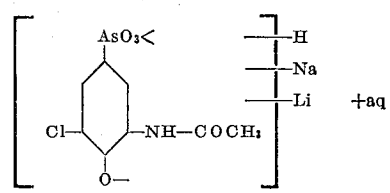

which product is a crystalline compound soluble in threefold its weight of water, very difficulty soluble in strong alcohol and acetone and insoluble in ether.

5. The potassium-lithium salt of 4-hydroxy-3-benzoylamino-benzene-1-arsonic acid of the formula:

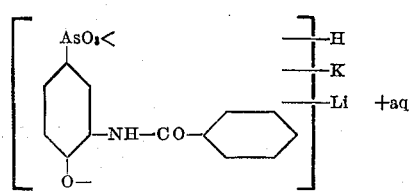

which product is a crystalline compound soluble in threefold its weight of water, very difficultly soluble in strong alcohol and acetone and insoluble in ether.

LOUIS BENDA.
OTTO SIEVERS.